United States Patent [19]

Toelke

[11] Patent Number: 4,646,561
[45] Date of Patent: Mar. 3, 1987

[54] METHOD AND APPARATUS FOR HYDROSTATIC TESTING OF TUBULAR MEMBER

[75] Inventor: Lester W. Toelke, Bellville, Tex.

[73] Assignee: Jack W. Hayden, Houston, Tex.

[21] Appl. No.: 831,549

[22] Filed: Feb. 25, 1986

Related U.S. Application Data

[63] Continuation-in-part of Ser. No. 636,841, Jul. 31, 1984, abandoned.

[51] Int. Cl.[4] .............................................. G01M 3/28
[52] U.S. Cl. ........................................ 73/49.5; 73/49.6
[58] Field of Search ................. 73/49.5, 49.6, 46, 49.1

[56] References Cited

U.S. PATENT DOCUMENTS

| | | | |
|---|---|---|---|
| 2,035,025 | 3/1936 | Seamark | 236/16 |
| 2,368,928 | 2/1945 | King | 166/10 |
| 2,655,182 | 10/1953 | Hayes et al. | 73/49.5 X |
| 2,671,338 | 3/1954 | Reichl | 73/37 |
| 2,707,388 | 5/1955 | Kent | 73/49.6 |
| 2,780,294 | 2/1957 | Loomis | 166/203 |
| 3,038,542 | 6/1962 | Loomis | 166/204 |
| 3,095,729 | 7/1963 | McConnell | 73/49.1 |
| 3,179,127 | 4/1965 | Terry | 138/90 |
| 3,331,238 | 7/1967 | Kost et al. | 73/49.5 |
| 3,371,521 | 3/1968 | Hauk | 73/46 |
| 3,464,708 | 9/1969 | Hamilton | 277/151 |
| 3,710,628 | 1/1973 | Horton | 73/49.5 |
| 3,897,039 | 7/1975 | LeRouax | 251/1 |
| 4,010,633 | 3/1977 | Hasha | 73/46 |
| 4,085,942 | 4/1978 | Yoshida et al. | 277/30 |
| 4,136,552 | 1/1979 | Hasha | 73/46 |
| 4,254,655 | 3/1981 | Keast et al. | 73/49.5 |
| 4,362,049 | 7/1982 | Horton | 73/49.6 |
| 4,377,185 | 3/1983 | Katz | 138/90 |
| 4,416,147 | 11/1983 | Hasha | 73/49.6 |
| 4,430,887 | 2/1984 | Roberts et al. | 73/49.8 |
| 4,458,522 | 7/1984 | Toelke | 73/49.6 X |

FOREIGN PATENT DOCUMENTS 1401761 4/1965 France .................... 73/49.5

Primary Examiner—Jerry W. Myracle
Assistant Examiner—Joseph W. Roskos
Attorney, Agent, or Firm—Jack W. Hayden

[57] ABSTRACT

Method and apparatus to hydrostatically test tubular members including a housing to enclose each end of the tubular member, which housing supports a unitary seal-lock ring assembly, the assembly having an annular resilient body with non-resilient L-shaped segments adjacent at least one end, anti-extrusion means adjacent the other end and an adjacent inner surface of the resilient body to close, seal and lock either or both the housings, selectively, about the open tubular member ends without closures engaged in or on the tubular member ends and without an axial end compressive force on the apparatus during hydrostatic test procedures.

28 Claims, 9 Drawing Figures

METHOD AND APPARATUS FOR HYDROSTATIC TESTING OF TUBULAR MEMBER

CROSS REFERENCE TO RELATED APPLICATION

This application is a continuation-in-part of my prior co-pending application Ser. No. 636,841, filed July 31, 1984, now abandoned. It also relates to my copending application Ser. No. 693,578 filed Jan. 22, 1985 for "Apparatus And Method To Test A Single Connection Between a Pipe Coupling And A Single Pipe End Connected Therewith."

BACKGROUND OF THE INVENTION

1. Field of the Invention

The present invention relates to fluid pressure testing of tubular members, and more particularly to hydrostatic internal fluid pressure testing of tubular members.

2. Description of the Prior Art

At the present time, plugs are threadedly, or otherwise, engaged with the end of a tubular member to seal it off for receiving and maintaining internal test pressure fluid within the tubular member. This type construction is disadvantageous in that the valving arrangement employed to vent the pipe as it is being fluid filled slows the filling thereof and slows the fluid dumping and hence increases the time required to test the tubular member. Furthermore, when the internal test pressure is applied against plugs engaged with the threads of the tubular member, the thrust load thereagainst may deform the threads, which is not necessarily visible to the eye, but becomes apparent when tested on location ready to be run into a well bore or the like. This causes substantial delay and expense.

Also, when test plugs are engaged on the end of the tubular member, the test pressure creates a substantial internal thrust end load tending to cause the plugs to fail and blow off. Various types of mechanism have been employed to maintain the plugs in position. This structure is massive and extremely expensive. Where no such structure is employed, the plugs may blow out which is extremely hazardous.

Further, when test plugs are employed, both plugs are fixed or secured on the tubular member which requires additional structure and piping arrangement for venting of the member during filling thereof.

Other structures presently employed for hydrostatic testing of tubular members, provide a seal arrangement with backup whereby fluid pressure may be supplied thereagainst to seal with the tubular member or a seal and separate securing arrangement is employed. The construction and arrangement of these prior art seals may require the use of structures to apply an external end compressive force against the testing apparatus to maintain it in position during the hydrostatic testing procedures of the tubular member.

The external compressive end load on the test structure to overcome the substantial internal thrust load caused by the internal hydraulic test pressure is substantial and requires massive structure to counteract it. Additional structure is generally employed to prevent buckling of the tubular member caused by internal hydraulic compressive load applied to the pipe ends during testing and this structure is also massive.

Because of the volume of the fluid employed in hydrostatic testing of tubular members, the test fluid (generally water) is reused, and it can be appreciated that a substantial amount of mill scale and other debris is collected in the test water. Since the test water of prior art devices is also employed to act on the seals and the clamping arrangements, the test water is generally filtered before reuse. This is expensive and time consuming.

SUMMARY OF THE PRESENT INVENTION

An object of the present invention is to provide test apparatus of relatively uncomplicated design and structure which can be easily positioned, locked and sealed on each end of the tubular member and maintained in position thereon as the tubular member is filled with test pressure fluid and hydrostatically tested without employing an external compressive force or without requiring any structure to overcome the internal compressive pipe end load to prevent buckling. The arrangement of the present invention does not require that it engage the threads of the tubular member; does not require any external compressive end loading on the tubular member to maintain the test apparatus in position during the test sequence of the tubular member; eliminates buckling of the tubular member due to internal hydraulic test pressure; does not necessarily require any separate valving arrangement for either venting the tubular member as it is filled or for draining the test fluid therefrom after it has been tested since the test heads on each end of the tubular member may be independently actuated so that one of them can be left open for the rapid filling and venting of the tubular member.

Further, the unitary seal-lock ring assembly of the present invention enables the tubular member to be maintained under no damaging end load. Rather, the tubular member is maintained under tension by the present invention to correspond with its load condition in a well bore during use.

Another object is to provide a unitary seal-lock ring assembly including an annular resilient body with at least one annular ring of non-resilient segments supported adjacent one end of said body to engage and lock on a tubular member and anti-extrusion means supported adjacent the other end of said body to inhibit extrusion of said resilient body during use, said seal-lock ring assembly, anti-extrusion means and resilient body constructed and arranged to transmit maximum radial thrust to seal and lock with a tubular member when pressure is applied to the resilient body.

Another object is to provide a unitary seal-lock ring assembly including an annular resilient body with at least one annular ring of non-resilient segments supported adjacent one end of said body to engage and lock on a tubular member and anti-extrusion means supported adjacent the other end of said body to inhibit extrusion of said resilient body during use, said seal-lock ring assembly, anti-extrusion means and resilient body constructed and arranged to transmit maximum radial thrust to seal and lock with a tubular member when pressure is applied to the resilient body, said anti-extrusion means being formed by a second annular ring of non-resilient segments carried adjacent the other end of the resilient body.

Another object is to provide a unitary seal-lock ring assembly including an annular resilient body with at least one annular ring of non-resilient segments supported adjacent one end of said body to engage and lock on a tubular member and anti-extrusion means supported adjacent the other end of said body to inhibit extrusion of said resilient body during use, said seal-lock ring assembly, anti-extrusion means and resilient body constructed and arranged to transmit maximum radial thrust to seal and lock with a tubular member when pressure is applied to the resilient body, said anti-extrusion means being formed by a second annular ring of non-resilient segments carried adjacent the other end of the resilient body with the non-resilient segments in each ring being formed by a radially extending end portion and an axially extending portion projecting laterally from the radially extending end portion.

Another object is to provide a unitary seal-lock ring assembly including an annular resilient body with at least one annular ring of non-resilient segments supported adjacent one end of said body to engage and lock on a tubular member and anti-extrusion means supported adjacent the other end of said body to inhibit extrusion of said resilient body during use, said seal-lock ring assembly, anti-extrusion means and resilient body constructed and arranged to transmit maximum radial thrust to seal and lock with a tubular member when pressure is applied to the resilient body, said anti-extrusion means formed by a second annular ring of non-resilient segments carried adjacent the other end of the resilient body with the non-resilient segments in each ring being formed by a radially extending end portion and an axially extending portion projecting laterally from the radially extending end portion and wherein the one annular ring of non-resilient segments includes a configured surface arrangement to assist in locking the unitary seal-lock assembly on the tubular member.

Another object is to provide a unitary seal-lock ring assembly including an annular resilient body with at least one annular ring of non-resilient segments supported adjacent one end of said body to engage and lock on a tubular member and anti-extrusion means supported adjacent the other end of said body to inhibit extrusion of said resilient body during use, said seal-lock ring assembly, anti-extrusion means and resilient body constructed and arranged to transmit maximum radial thrust to seal and lock with a tubular member when pressure is applied to the resilient body, said anti-extrusion means being formed by a second annular ring of non-resilient segments carried adjacent the other end of the resilient body, said non-resilient segments of said one annular ring being formed by a radially extending end portion and an axially extending portion projecting laterally from the radially extending end portion and said non-resilient segments of said second annular ring being formed by radially extending portions.

Another object of the present invention is to fluid pressure test a tubular member without applying a compressive end force thereagainst and without damaging the threads or connection seal surfaces.

Yet a further object of the present invention is to fluid pressure test a tubular member under tension load conditions as it may encounter during use in a well bore.

Additionally, since the apparatus of the present invention enables the test heads at each end of the tubular member to be independently and selectively sealed and locked, and since the unitary seal-lock ring assembly of the present invention is not necessarily initially actuated by the test pressure fluid conducted internally to the tubular member, no filtration of the test pressure fluid is required.

By reason of all of the foregoing, the test apparatus is substantially simplified, the time and cost for testing a tubular member is substantially reduced, and the test apparatus may more readily be accommodated for field testing of tubular members.

DESCRIPTION OF THE PREFERRED EMBODIMENT

Figure 1:
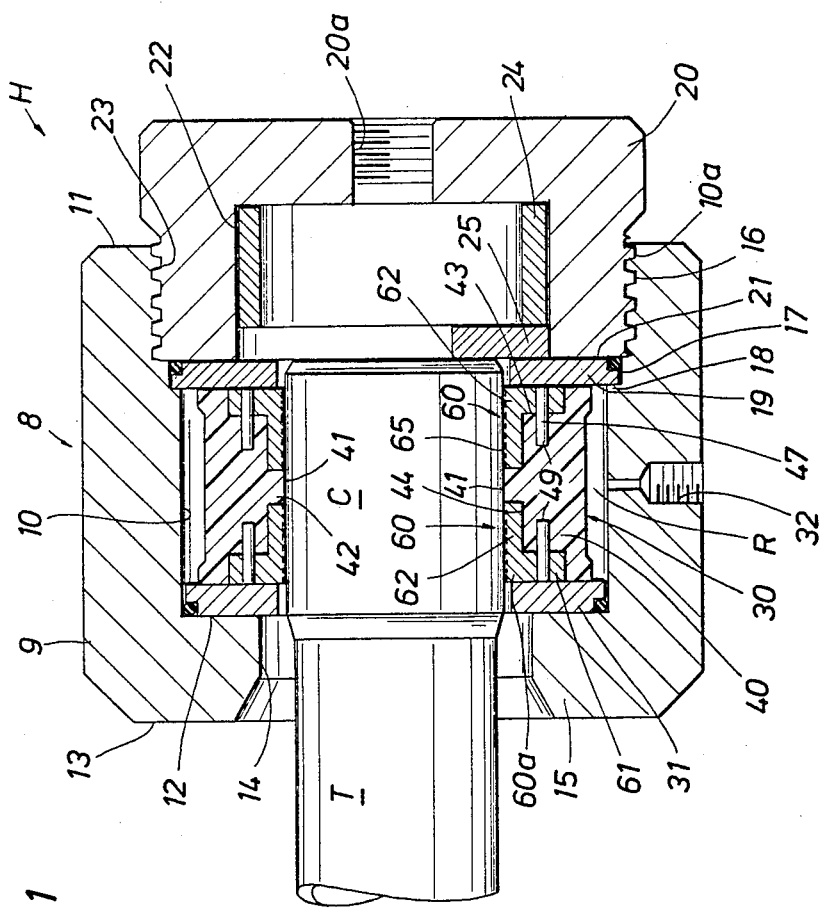
FIG. 1 is a sectional view showing the unitary seal-lock ring assembly of the present invention on each end of the tubular member.
Figure 2:
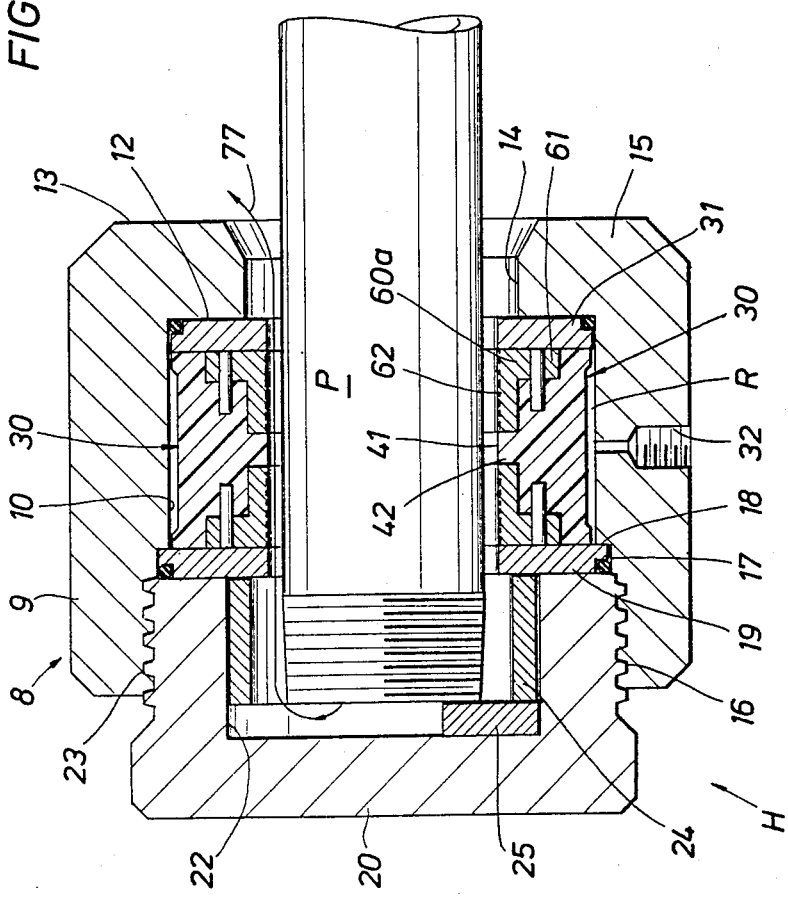
FIG. 2 is a perspective view of the L shaped non-resilient segments of the present invention.

Attention is first directed to FIG. 1 wherein a test head is shown generally by the numeral 8 and includes a first annular member 9 having a bore 10 extending from one end 11 thereof and terminating in spaced relation at 12 to the other end 13. An opening 14 is provided through the other end of the first annular member 9, which opening is of smaller diameter than the diameter of the bore 10 to form a radial annular flange 15 adjacent the other end of said first annular member 9. Thread means 16 are provided in a first counterbore 10a adjacent the end 11 of the first annular member, and a second counterbore 17 of smaller diameter provides a shoulder 18 for positioning the inner end 21 of second annular member 20, as well as securing spacer ring 19 between the shoulder 18 and the end 21 of the second annular member 20. The second annular member 20 has annular recess 22 therein, and threads 23 on the outer surface thereof engage with the threads 16 formed on the first annular member whereby the first annular member 9 and second annular member 20 may be connected together. A spacer ring 24 in the recess 22 engages a segment 25 of a disk to position it so that it acts as a stop for the end of the tubular member T as will be described. The second annular member 20 includes a passage 20a therethrough for supplying test fluid internally to the tubular member T.

The shoulder formed by the termination of the bore 10 and the end 21 of the second annular member 20 provide an inwardly facing, longitudinally extending annular recess R therebetween.

The unitary seal-lock ring assembly referred to generally at 30 of the present invention is positioned within the recess by the spacer ring 19 at one end and by the spacer ring 31 which abuts the shoulder 12 formed by the end of the bore 10 as shown in FIG. 1. The unitary seal-lock ring assembly 30 is movable radially into sealing and locking engagement with the tubular member represented by the letter T when pressure fluid is supplied to the annular recess R through the port means 32 in the test head 8 as will be described.

When the first and second annular members 9 and 20, respectively, are connected together as illustrated in FIG. 1 of the drawings a housing H is formed and provides a closed end to prevent the tubular member T from passing therethrough whereas the opening 14 in the other end of the housing H receives the end of the tubular member T therein, and it is abutted against the disc segment 25 as shown in FIG. 1. As previously noted, the housing H provides between its ends an annular, inwardly opening annular recess R defined by the radial flange 15 and end 21 of member 20. The spacer rings 19 and 31, respectively, are positioned adjacent the respective ends of the second and first annular members 20 and 9 to receive the seal-segment assembly therebetween.

Test head 8 including the housing H formed by the first and second annular members 9 and 20 is positioned on the coupling end C of the tubular member T while a test head 8 including a housing H formed by the first and second annular members 9 and 20 is positioned on the pin end P of the tubular member T as shown in the drawings. It is to be noted that the housings H of the present invention are identical and like numbers are applied to the housing means on both the pin end P and coupling end C.

The unitary seal-lock ring assembly 30 of the present invention carried in the recess R of the housing H includes a resilient annular body 40 formed of any suitable material such as an elastomer or urethane. The body 40 is generally rectangular in cross-section with an inner annular surface 41 having a portion 42 thereof engageable with the tubular member T for sealing therewith. In the arrangement shown, the portion 42 seals on the coupling C and on the surface of the tubular member T adjacent the threaded pin end P at the other end. At least one annular ring referred to at 60 and formed of segments 60a of non-resilient material such as metal or a suitable plastic and of generally "L" shape is mounted on the resilient body to engage and lock on the tubular member T when fluid pressure is supplied to act on the resilient body 40 to move the resilient body and annular ring 60 formed of the segments 60a into sealing and locking engagement on the tubular member T.

The "L" shape of the segments 60a enables them to suitably enclose the body 40 at an end portion and retain adequate volume in the body 40 for it to provide the desired seal as well as surface area for transmitting radial force over the extent of the segments 60a to provide a lock to selectively secure either or both the housings H on the tubular member T without any end axial compressive loading throughout the test sequence.

The segment "L" shape is defined by a radially extending end portion 61 with an axially extending portion 62 projecting laterally from said end portion 61. The axially extending portion 62 is of greater extent axially than the radial extent of said radially extending end portion 61 as shown in the drawings. Also, it will be noted that the unitary seal-lock ring assembly 30 shown in FIG. 1 includes a pair of nonresilient annular rings 60, with one ring being adjacent each radial end of the resilient body 40 and with the ends of the axially extending portions 62 of said non-resilient segments being spaced longitudinally along the inner facing annular surface 41 of the resilient body 40 to provide an annular portion 42 on the inner facing annular surface between said annular rings 60 for sealably engaging about the tubular member when the unitary seal-lock ring assembly 30 is moved by fluid pressure to engage the tubular member T. Further, the resilient body 40 is provided with a recessed portion 43 along the radial ends thereof, when two non-resilient annular rings are employed in the assembly, and is also provided with a recessed portion 44 along the inner annular surface 41 to receive the segment radial end portion 61 and the segment axially extending portion 62, respectively, as illustrated in the drawings. The segments may be mounted on the resilient body 40 by means of a pin 47 extending through an opening 48 in the end portion 61 of the segments and into an opening 49 provided in the resilient body 40 so that the segments forming the non-resilient annular ring may be replaced when necessary.

The lowermost surface 65 of the axially extending portion is arcuate and extends circumferentially and may be provided with a suitably configured arrangement such as serrations or the like to assist in gripping and locking on the tubular member T. It will be noted that the radially extending end portions 61 are also circumferentially extending to the same general extent that the axially extending portion 62 extends circumferentially.

The substantial void between segment radial portion 61 and axial portion 62 enables the segments 60a to receive the annular resilient body 40 therein so that the body 40 generally retains its rectangular shape in cross section even where contacted by the segments while enabling the segments 60a to be mounted on and to enclose resilient body 40 where contacted by the segments. This arrangement provides a maximum volume of resilient body 40 to respond to pressure for sealing and transmitting a maximum locking force in a radial direction to the segments 60a.

Figure 5:
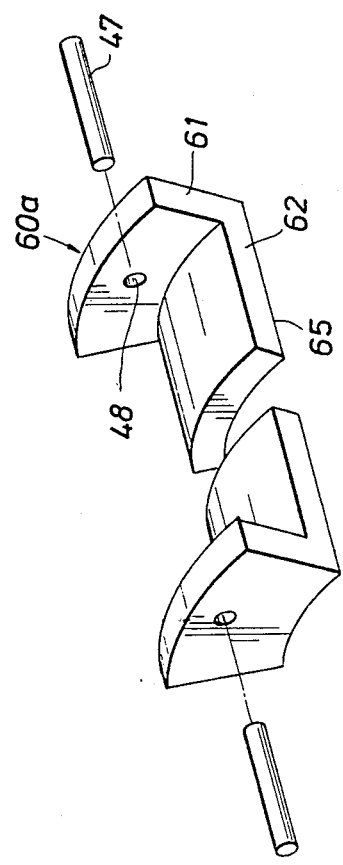
FIG. 5 shows the unitary seal-lock ring assembly with only one annular lock ring formed by the segments.

In FIG. 5, the resilient body 40 is again illustrated as being generally rectangular in cross-section and is provided with an inner annular surface 41 which provides a portion 42 for sealably engaging with the tubular member. The surface 41 is recessed as illustrated at 44 for receiving the axially extending portion 62, and one radial end of the resilient body 40 is recessed as illustrated at 43 for receiving said radially extending end portion 61 of the segments forming the non-metallic annular ring. In the FIG. 5 unitary seal-lock ring assembly 30, only one annular non-resilient annular ring is provided.

Figure 3:
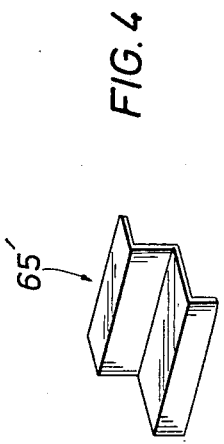
FIG. 3 illustrates an alternate form of unitary seal-lock ring assembly with Z shaped secondary non-resilient segments for fitting between the resilient seal body and the segments forming the annular ring, which Z shaped segments also span the circumferential space between adjacent circumferential segments in the annular ring at higher pressures.
Figure 4:
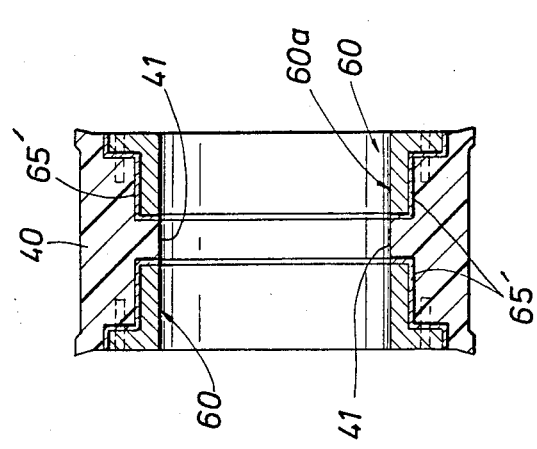
FIG. 4 is a perspective view of the Z shaped secondary segment.

In FIG. 3, the resilient body 40 is again illustrated as are a pair of annular rings formed of non-resilient segments of generally "L" shape. However, a secondary segment of generally "Z" shape as shown in FIGS. 3 and 4 at 65' is provided between the resilient body 40 and the segments 60 forming the annular non-resilient rings 60. Also, the "Z" shaped secondary segments 65' span the circumferential space between adjacent segments 60 to inhibit extrusion of the resilient body 40 under extremely high pressures.

Figure 6:
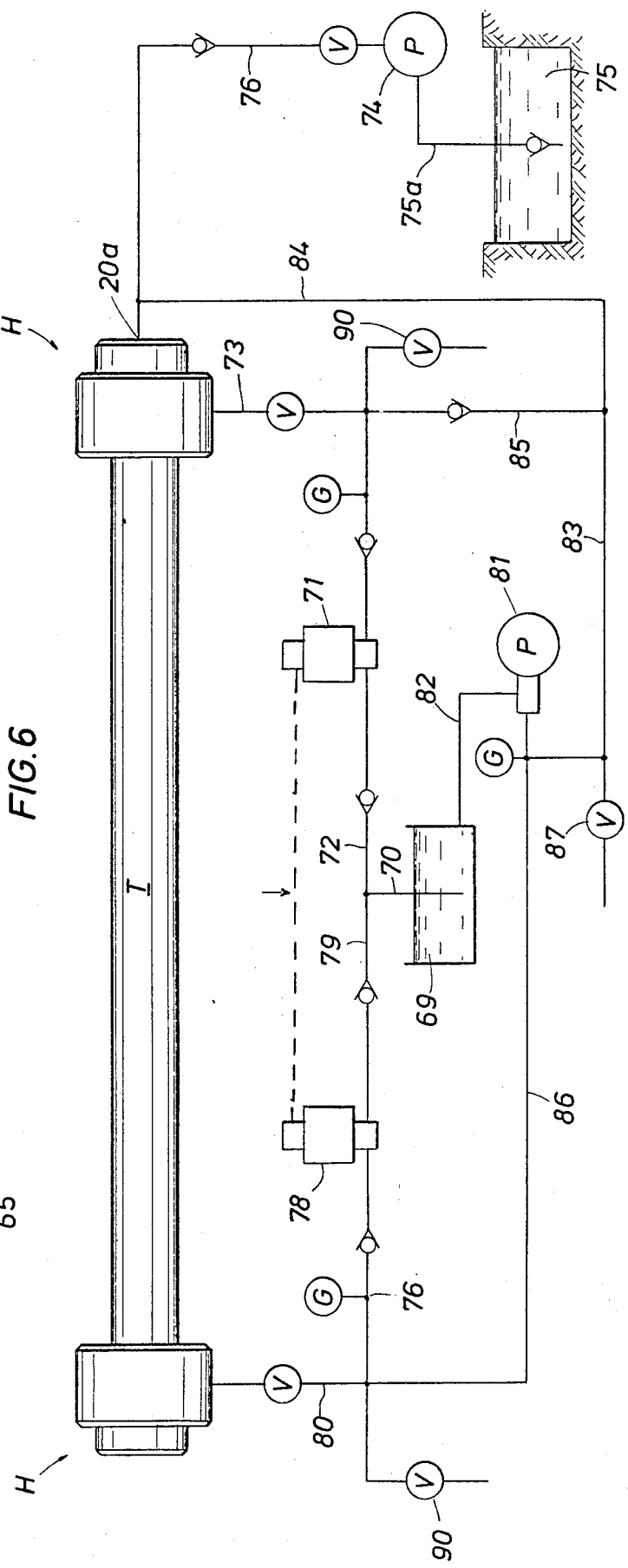
FIG. 6 is a diagrammatic illustration of the conduit arrangement for hydrostatically testing a tubular member with the present invention.

In employing the present invention to hydrostatically test tubular members, the first housing H is placed on the coupling end, and the second housing H is placed on the pin end P of the tubular member T where the tubular member T is provided with a coupling C and a threaded pin end P as shown in FIG. 1 and a represented in FIG. 6. It can be appreciated that in some instances plane end tubular members may be tested, and in that event, a housing H will be placed adjacent each end of the tubular member T.

The unitary seal-lock ring assembly 30 is actuated by fluid pressure injected through the port means 32 of the housing to move the resilient body 40 and the annular ring 60 of non-resilient segments 60a mounted thereon into sealing and locking engagement, respectively, with the tubular member T. This is demonstrated as having been accomplished in FIG. 1 and may be accomplished by the arrangement diagrammatically illustrated in FIG. 6. Fluid flow to port means 32 is independent of and separate from test fluid flow to tubular member T and pressuring thereof through passage 20a.

A clean water source of supply is demonstrated at 69 and communicates with the conduit 70 which is connected to pumps 71 and 78. A suitable power source represented by the arrow in FIG. 6 ending at the dotted line is connected to pumps 71, 78 as represented by the dotted line. Switches, if electrical energy, and valves, if pneumatic power is employed, are provided in the dotted line on each side of the arrow to selectively control the energy flow to pumps 71, 78. This enables the pumps to be independently and selectively actuated for supplying fluid to either or both housings H. In one test procedure, when only the pump 71 is activated, it will draw fluid through conduits 70, 72 to discharge it through conduit portion 73 into port means 32 of the first housing H on one end of the tubular member T to act on the unitary seal-lock ring assembly 30 so that the resilient body 40 moves radially inwardly and carries with it the segments 60a thereon to seal and lock the first housing H on the one end of the tubular member T. The fluid supplied by pump 71 is at a first predetermined pressure, for example, 1500 or 2000 pounds per square inch, which is sufficient to set the unitary seal-lock ring assembly 30 in sealing and locking relationship on the end of the tubular member T. After this has been accomplished, pump 74 is activated to withdraw water from reservoir 75 through conduit 75a and conducts it through conduit 76 to discharge through passage 20a in the first housing to fill the tubular member T. It freely flows to the open end of the tubular member since disc 25 covers only a portion of the tubing end. As the tubular member T fills, air is free to vent from the tubular member T in the space between the second housing H on the other end of the tubular member T and the tubular member T as represented by the arrow 77 in FIG. 1. When the tubular member T is filled with test fluid, which may be visually noted by the discharge of fluid out the end of the second test head from between it and the tubular member T, the unitary seal-lock ring assembly 30 in the second housing H is activated by starting pump 78 to withdraw water through the conduit 79 from the clean water source 69 to discharge it through conduit portion 80 and port 32 to act on unitary seal-lock ring assembly 30 and move it radially inwardly to seal the resilient body 40 with the tubular member T and lock the segments 60a with the tubular member T. The pump 78 supplies a first predetermined pressure in the same general range such as 1500 to 2000 pounds as that supplied by pump 71 to the first housing. FIG. 6 schematically shows a valve arrangement to maintain the initial pressure on the assemblies in each housing, as desired. Also, this arrangement supplies clean water to the seals.

After the unitary seal-lock ring assemblies 30 have been activated as above described so that the resilient body 40 moves to sealingly engage the tubular member T while also urging the segments 60a into locking position thereon, the high pressure pump 81 is activated to withdraw fluid from the clean water source 69 through the conduit 82 and supply it to the filled interior of the tubular member T by means of the conduit 83 and conduit portion 84. Such pressure fluid is also simultaneously communicated through conduit 85 to the unitary seal-lock ring assembly 30 in the first housing H and through conduit 86 and conduit portion 80 to act on the assembly 30 in second housing H. Thus, the interior test pressure and the pressure maintained on the unitary seal-lock ring assemblies 30 is substantially the same. The internal test pressure may be any desired, such as, for example, 10,000 pounds per square inch or less or more, depending upon the type of tubular member being tested.

After the test pressure has been maintained for a predetermined time, the pressure on the unitary seal-lock ring assemblies 30 and the internal test pressure in the interior of the tubular member T is relieved by opening one or both valves 90 to enable the pressure fluid acting on the unitary seal-lock ring assemblies 30 to discharge or dump from the housings H back to reservoir 75. The reservoir is generally located below the tubular member being tested so that the test fluid dumped at the end of a test falls in pit 75. The internal test pressure fluid may dump through the open unitary seal-lock ring assemblies 30, the tubular member removed from the housings H, and the test procedure repeated on the next length of tubular member T.

In certain situations, such as field testing, the unitary seal-lock ring assembly 30 in each housing H will be first actuated by fluid pressure to secure and seal both housings H on the tubular member ends to conserve the test fluid. Fill fluid is then supplied to tubular member T as described herein, and venting is accomplished through a valve secured on the housing H on the pin end. When the tubular member is filled, the vent valve is closed. The tubular member T and unitary seal-lock ring assemblies 30 are then pressurized to the desired test pressure as described herein, and when the test is completed, the test fluid is dumped from the tubular member T as stated herein. If desired, the unitary seal-lock ring assemblies 30 may first be actuated and pressured to the desired test pressure and a separate pump and conduit system used to supply fluid to fill tubular member T and pressure it to the desired test pressure. Thus, the present invention enables the housings to be selectively sealed and secured on the tubular member and enables the tubular member and unitary seal-lock ring assemblies to be selectively pressured.

As previously noted, where a seal-lock ring assembly 30 is employed adjacent each end of the resilient body 40, the body 40 is enclosed which inhibits extrusion of the body 40 under pressure and provides an arrangement with a maximum volume responsive to fluid pressure for exerting a maximum radial thrust to form both a sealing and locking relationship with the tubular member.

Figure 7:
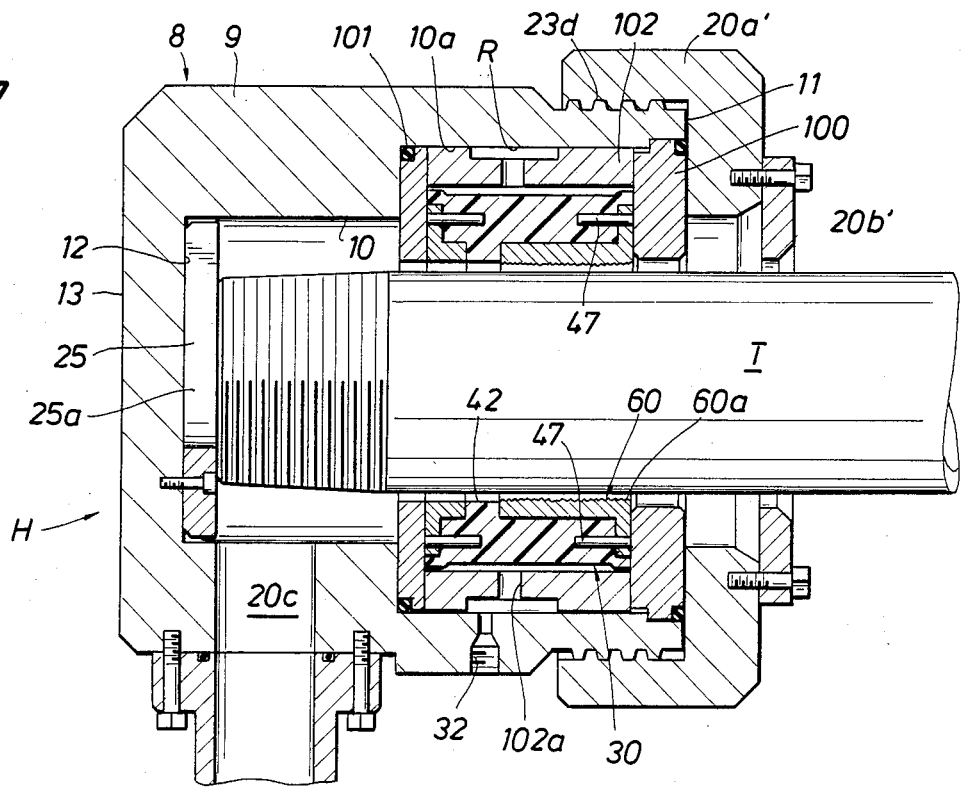
FIG. 7 is a sectional view of an alternate form of the unitary seal-lock ring assembly of FIG. 5 positioned in the housing that receives the end of a tubular member for fluid pressure testing.

In FIG. 7 a test head is again generally referred to at 8 and includes a first annular member 9 having a bore 10 extending from one end 11 thereof and terminating in spaced relation at 12 to the other end 13. A second annular member 20a' is secured on first annular member 9 by any suitable means such as threads 23d as shown in the drawings to form the housing H. An opening 20b' is provided in the second annular member 20a' through which the tubular member T may be extended for reception in the housing represented generally at H. A disc 25 is positioned adjacent the inner end of bore 10 and is provided with a slot or opening 25a whereby the end of the tubular member abuts the disc 25 to space the end of the tubular member T from the end of the housing H whereby fill fluid and pressuring of the tubular member T may be accomplished through the opening 20c to the open end of the tubular member adjacent the groove or opening 25a as illustrated in FIG. 7. A counterbore 10a in first member 9, along with the annular flange formed on member 20a' forms an inwardly facing, longitudinally extending recess R in the housing means H in which suitable spacer rings 100, 101 and 102 may be positioned as desired. The recess R in the housing means H receives the unitary seal-lock ring assembly referred to generally at 30 between the spacer rings 100, 101, and 102, when such spacer rings are employed in the recess R. The spacer ring 102 will be provided with suitable passages 102a to communicate pressure fluid from port means 32 to act on resilient body 40. The unitary seal-lock ring assembly 30 is movable radially into sealing and locking engagement with the tubular member T by means of fluid pressure supplied through the port means 32 which communicate with the recess R in a manner as previously described, or by other suitable piping arrangements as may be desired.

Figure 8:
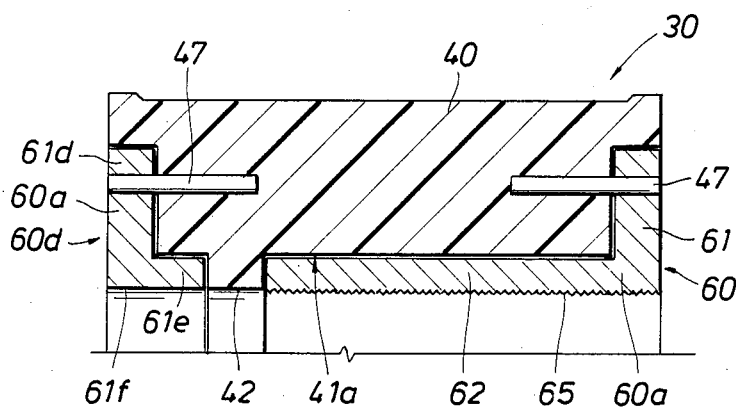
FIG. 8 is an enlarged sectional view illustrating the seal-lock ring assembly shown in FIG. 7.
Figure 9:
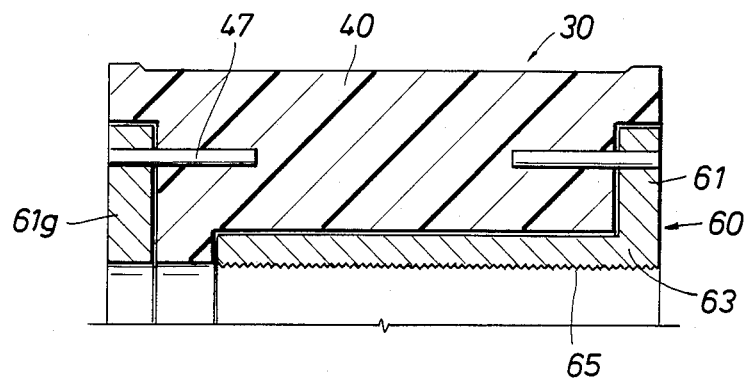
FIG. 9 is a sectional view similar to FIG. 8 illustrating an alternate form of the anti-extrusion means mounted adjacent one end of the resilient body.

The seal-lock ring assembly of FIGS. 7–9 illustrates a preferred embodiment, and is similar in function, construction and configuration to that described with regard to FIGS. 1–5. The construction and arrangement of the seal-lock ring assembly 30, is such that when fluid pressure is supplied through the port means 32 to the recess R, it will act on the resilient body 40 and transmit a maximum radial thrust to sealingly and lockingly engage the seal-lock ring assembly 30 and test heads H with the tubular member T to enable fluid pressure testing thereof to be accomplished while overcoming most, if not all of the problems of prior art devices hereinbefore described.

The seal-lock ring assembly of FIGS. 7–9 includes a resilient annular body 40 formed of any suitable material as previously described with regard to FIGS. 1–5. The first, or one, annular row or ring formed of segments 60a, is referred to at 60 and is provided adjacent one end of the resilient body 40 as shown in FIGS. 7–9. The segments 60a are each formed as previously described with regard to FIGS. 1–5 and formed of non-resilient material such as metal, or a suitable plastic. Each of the circumferentially extending segments 60a is mounted on the resilient body 40 by means of the pin 47 extending therethrough as better illustrated in FIG. 8. Similarly, each segment 60a is defined by a radially extending end portion 61 with an axially extending portion 62 projecting laterally from the end portion 61. In the form of the segments 60a mounted adjacent an end of the resilient body 40 to form the one, or first, row 60 shown in FIGS. 7–9, the inner or lowermost arcuate surface 65 of the axially extending portion 62 is arcuate and extends circumferentially and is preferably provided with a suitable configured arrangement such as serrations or the like to assist in gripping and locking on the tubular member T.

Also, the axially extending portion 62 of the segments 60a in the embodiment of FIGS. 7–9 not only is of substantially greater extent longitudinally than the radial extent of the radially extending end portions 61 of the segments, but such axially or longitudinally extending portion 62 extends greater than one-half of the total longitudinal extent of the inner annular surface referred to generally at 41a which extends from one end to the other of the resilient body 40. As shown, the axial portion extends substantially the entire longitudinal extent of surface 41a, except for the relatively small space occupied by the second row or ring 60d of segments and the annular portion 42 of body 40 between rows or rings 60 and 60d, which annular portion 42 is provided to sealingly engage member T. This provides a maximum amount, or length, of inner surface 41a of body 40 which is responsive to pressure fluid for transmitting a maximum radial locking and sealing force to the segments 60a in the one, or first row 60.

In the FIGS. 7–9 embodiment, as well as in the FIGS. 1–5 embodiment, a second row of segments 60d is preferably employed on the other end of the resilient body 40 which, in the FIGS. 1–4 embodiment functions as a seal lock ring assembly as well as a retainer means to inhibit extrusion of the resilient body 40 when fluid pressure is applied thereto.

In the FIGS. 7–9 embodiment, it will be noted that the second row of segments referred to generally at 60d also include in FIGS. 7 and 8 segments 60a formed by radially extending end portions 61d and an axially extending portion 61e which projects laterally and axially of the end portion 61d. The segments 60a forming the second row or ring 60d are mounted on the resilient body 40 by means of a pin 47 which extends through the radially extending end portion 61d into the resilient member or body 40 as shown. It will be noted that the end of the axially extending portion 62 of the segments 60a in the first row 60 terminates at a point along the inner annular surface 41a in spaced relation to the end of the axially extending portions 61e in the second ring or row of segments 60d to form an annular space therebetween for receiving the projecting annular portion 42 formed on inner annular surface 41a of body 40. The portion 42 between the rings of segments sealably engages with the member T when the resilient body 40 is subjected to fluid pressure through the port 32. Also, it is to be noted that in FIGS. 7–9 the inner annular surface 61f of each axially extending portion 61e of the segments 60a in ring 60d is not serrated or configured.

In addition, it will be noted that the axially extending portion 61e of the segments 63 forming the second row of segments is shown as less than the extent of the radial portions 61d.

The arrangement and configuration of the segments 60a in the first or seal-lock row 60 and segments 60a in the second or retainer row 60d carried on body 40 is such that substantially all of the fluid pressure applied to annular body 40 is transmitted as a radial locking and sealing force to secure the test heads H on the tubular member T.

The test heads H thus enclose the ends of member T and as noted previously, the internal pressure in member T applies an internal thrust load on the housings H. Since the housings H are locked on and enclose the ends of the member T under tension while it is tested. The tension load simulates its load condition in a well during use.

The body 40 in the FIGS. 7–9 form is provided with recesses adjacent its ends and on the inner surface 41a as described with regard to FIGS. 1–5 to receive the segments 60a to enclose and protect the body 40 to inhibit extrusion thereof under pressure during use. In the FIG. 9 form recesses are present only adjacent the end of the body 40, as shown.

In FIG. 9 a construction of the seal-lock assembly is further demonstrated similar to that shown in FIGS. 7 and 8 and the retainer means formed by a second row of non-resilient segments is shown as comprising radial segment portions 61g which are mounted adjacent the other end of the resilient body 40 by means of the pins 47. These radial segment portions 61g extend circumferentially as previously described, but do not extend axially of body 40.

The substantial longitudinal extent of the axially extending portion 62 of the first row 60 of non-resilient segments 60a provides a surface area which responds to the radial thrust of the elastomer body 40 to apply a maximum radial gripping force or action on the member being tested and assist in securing the housing means H on the member without the application of end compressive loads to retain the housings in position during fluid pressure testing of the pipe.

The function of the segments 60a in the FIGS. 7–9 form is similar to that of the FIGS. 1–5 modification. When the segments 60a and body 40 respond to pressure and move to sealing and locking relationship with the tubular member T, the segments 60a engage, or are in close proximity to each other in side by side relationship to prevent extrusion of the resilient body. Where higher pressures are encounted the "Z" form 65' of FIGS. 3 and 4 may be employed.

The present invention has been described where water is the test medium; however, it can be appreciated that any suitable test fluid, liquid or gas may be employed.

The present invention also, in addition to its other advantages, enables a leak to be determined between the coupling and tubular member since it may be visually inspected during the internal pressure test.

All of the foregoing is accomplished without any internal or external compressive end loading and without any additional structure to then counteract the compressive end loading which might tend to buckle the tubular member T. The construction and arrangement of the present invention seals and locks the housings, selectively, on the tubular member T while filling the tubular member T and while internal pressure testing it without requiring any external compressive force to maintain them in sealed and locked position. Suitable seals are provided where necessary as shown in the drawings.

The foregoing disclosure and description of the invention are illustrative and explanatory thereof, and various changes in the size, shape and materials as well as in the details of the illustrated construction may be made without departing from the spirit of the invention.

What is claimed is:

1. A test head which does not require a compressive end force thereagainst to maintain it in sealed and locked relationship on the end of a tubular member as the member is internally fluid pressure tested, comprising:

a housing having one end closed to prevent the tubular member from passing therethrough with an opening in the other end for receiving the end of the tubular member, said housing providing between its ends an annular, inwardly opening recess defined by radial, annular extending end surfaces;

a unitary seal-lock ring assembly within the housing recess constructed and arranged to maintain said housing sealed and locked on the tubular member without requiring an external compressive end force on said housing while internal fluid pressure testing the tubular member;

said assembly comprising an annular resilient body substantially rectangular in cross-section with an inner annular surface having a portion thereof engageable with the tubular member for sealing therewith; and at least one annular ring formed of non-resilient segments of generally "L" shape mounted on said body to engage and lock on the tubular member; and said segment "L" shape being defined by a radially extending end portion with an axially extending portion projecting laterally from said end portion, said axially extending portion being of greater extent axially than the radial extent of said radially extending portion; and said resilient body having a recess along a radial end thereof and along the inner annular surface to receive said segment end portion and said axially extending portion, respectively; and said housing having port means to conduct fluid pressure to said resilient body in the recess to move said assembly radially into sealing and locking engagement on the tubular member.

2. The test head of claim 1 including additional port means in said housing for supplying internal fill and test pressure fluid to the tubular member separate from said port means which conducts fluid to said assembly.

3. The test head of claim 1 wherein said assembly includes a pair of non-resilient annular rings adjacent each radial end of said resilient body and with the ends of said axially extending portions of said segments in each annular ring being spaced longitudinally along said inner facing annular surface of said resilient body to provide an annular portion on the inner facing annular surface between said annular rings for sealably engaging the tubular member when the assembly is moved by pressure fluid to engage the tubular member.

4. The test head of claim 1 wherein said housing includes a first annular member having a bore extending from one end thereof and terminating in spaced relation to the other end of said first annular member; an opening through said other end of smaller diameter than the bore in said first annular member to form a radial annular flange adjacent said other end of said first annular member, thread means on the bore adjacent said one end of the first annular member; a second annular member having an annular recess therein and threads on its outer surface adjacent one end for threading said one end of the second annular member into the bore of the first annular member whereby the end of the second tubular member is positioned in longitudinally spaced relationship to the annular flange on said first annular member to provide the continuous inwardly, annular facing recess therebetween.

5. The test head of claim 1 including secondary non-resilient segments of generally "Z" shape fitting between said resilient body and said annular ring segments and spanning the circumferential space between adjacent segments in the annular ring to inhibit extrusion of said resilient body between said circumferentially spaced adjacent segments forming the annular ring.

6. The test head of claim 1 including means to supply fluid pressure to said housing port means to act on said assembly and move it to seal and lock said housing on the tubular member.

7. A tubular member internal fluid pressure testing apparatus including a test head arrangement which does not require an external compressive end force thereagainst to maintain the arrangement in sealed and locked relationship on the end of a tubular member as the member is internally fluid pressure tested, comprising:
- a first housing having one end closed to prevent the tubular member from passing therethrough with an opening in the other end for receiving one end of the tubular member, said housing providing between its ends an annular, inwardly opening recess defined by radially extending end surfaces;
- a second housing having one end closed to prevent the tubular member from passing therethrough with an opening in the other end for receiving the other end of the tubular member, said housing providing between its ends an annular, inwardly opening recess defined by radially extending end surfaces;
- a unitary seal-lock ring assembly within the recess of each said first and second housing whereby said first and second housings may be either independently or both sealed and locked on the tubular member without requiring an external end compressive force thereon while fluid pressure testing it;
- said assembly comprising an annular resilient body having radial ends with an inner annular surface having a portion thereof engageable with the tubular member for sealing therewith; and non-resilient generally "L" shaped segments forming a ring on the inner annular surface and on each radial end of said resilient body;
- said first and second housings each having port means to conduct fluid pressure to said resilient body in the recess to move said assembly radially into sealing and locking engagement on the tubular member; and
- an opening in said first housing for conducting fill and pressure test fluid to the tubular member independently and separate from the port means that conducts fluid to said assembly.

8. The apparatus of claim 7 including:
- means to selectively supply fluid pressure of a first predetermined pressure to said first and second housing port means to selectively act on and move the respective assemblies to seal and lock either or both of them on the tubular member;
- means to supply fluid to the opening in said first housing to fill the tubular member separate from the fluid pressure to the first and second housing port means; and
- means to pressure the fluid filled tubular member and said seal-lock ring assemblies simultaneously to a higher predetermined pressure than the first predetermined pressure on said seal-lock ring assemblies to internal pressure test the tubular member and lock the housings on the ends of the tubular member during the test.

9. In a testing apparatus for internally fluid pressure testing a tubular member, which testing apparatus has housing means having one end closed to prevent the tubular member from passing therethrough with an opening in the other end for receiving an end of the tubular member, said housing means having an annular, inwardly opening recess defined by radially extending end surfaces for receiving a unitary seal-lock ring assembly therein to seal and lock the housing means on a tubular member whereby it may be filled with test fluid and pressure tested without employing an external end compressive force on the apparatus, an improved annular seal-segment assembly comprising:
- an annular resilient body substantially rectangular in cross-section with an inner annular surface having a portion thereof engageable with the tubular member for sealing therewith; and at least one annular ring formed of non-resilient segments of generally "L" shape mounted on said body to engage and lock on the tubular member and said segment "L" shape being defined by a radially extending end portion with an axially extending portion projecting laterally from said end portion, said axially extending portion being of greater extent axially than the radial extent of said radially extending portion; and said resilient body having a recess along a radial end thereof and along the inner annular surface to receive said segment end portion and said axially extending portion, respectively.

10. The improved seal assembly of claim 9 wherein said assembly includes a pair of non-resilient annular rings adjacent each radial end of said resilient body and with the ends of said axially extending portions of said segments in each annular ring being spaced longitudinally along said inner annular surface of said resilient body to provide an annular portion on the inner annular surface between said annular rings for sealably engaging the tubular member when the unitary seal-lock ring assembly is moved by fluid pressure to engage the tubular member.

11. A method of internal fluid pressure testing a tubular member without employing an external end compressive force comprising the steps of:
- placing over each end of the tubular member a housing having a unitary seal-lock ring assembly therein which includes a resilient annular seal body with at least one annular ring mounted thereon and formed of circumferential non-resilient segments;
- selectively supplying fluid pressure at a first predetermined pressure to the housings to radially contract either or both of the seal-lock ring assemblies into sealing and locking relationship at each end of the tubular member;
- thereafter supplying internal fill fluid to the tubular member in one of the housings while venting the tubular member through the other housing;
- closing the vent; and
- increasing the pressure simultaneously in the fluid filled tubular member and housings to a higher fluid pressure than the first fluid pressure supplied to the housings to internal pressure test the tubular member and lock the housings on the ends of the tubular member at the higher pressure during the test.

12. In a fluid pressure testing apparatus for a tubular member wherein the tubular member is enclosed in a housing means, the invention of a unitary seal-lock ring assembly for reception in the housing means to seal and lock the housing means on the tubular member to enable a tension to be applied to the tubular member while internally fluid pressure testing it, said seal-lock ring assembly including:

an annular resilient body having an inner annular surface portion engageable with the tubular member for sealing therewith;

at least one annular ring of non-resilient segments mounted adjacent one annular end of said resilient body, said segments formed by a generally radially extending end portion and an axially extending portion projecting laterally from said radially extending end portion to engage and lock the assembly on the tubular member; and anti-extrusion means mounted adjacent the other annular end of said resilient body.

13. The invention of claim 12 wherein said axially extending portion of said segments is of greater extent axially than the radial extent of said radially extending portion.

14. The invention of claim 13 wherein the axially extending portion of said segments of said one annular ring extends axially more than one-half of the total longitudinal extent of said inner annular surface of said resilient body and wherein said second ring of segments is spaced from the end of said axially extending segment portions of said one annular ring to provide a space for said inner annular surface portion of said body that sealingly engages the tubular member.

15. The invention of claim 12 wherein said anti-extrusion means comprises a second annular ring of non-resilient segments.

16. The invention of claim 12 wherein said second ring of non-resilient segments is formed by a generally radially extending end portion and an axially extending portion projecting laterally from said radially extending end portion to resist extrusion of said resilient body when fluid pressure is applied thereto.

17. The invention of claim 16 wherein said second ring of non-resilient segments is formed by radially and circumferentially extending members.

18. The invention of claim 12 wherein said second ring of non-resilient segments is formed by radially extending members.

19. The invention of claim 12 wherein the axially extending portion of said segments extends substantially the longitudinally extent of said inner annular surface of said resilient body and wherein said second ring of segments is spaced from the end of said axially extending segment portions of said one annular ring to provide a space for said inner annular surface portion of said body that sealingly engages the tubular member.

20. A method of applying tension to a tubular member while internally fluid pressure testing it comprising the steps of:

enclosing each end of the tubular member with a housing having a unitary seal-lock ring assembly therein which assembly includes a resilient annular seal body with annular rings formed of non-resilient segments mounted adjacent each end of the body;

selectively supplying fluid pressure to the housings to radially contract either or both of the seal-lock ring assemblies into sealing and locking relationship at each end of the tubular member;

thereafter supplying internal fill fluid to the tubular member in one of the housings while venting the tubular member through the other housing;

closing the vent; and increasing the fluid pressure in the housings to lock the housings on the ends of the tubular member and place the tubular member in tension while it is internally pressue tested with the housings sealed and locked thereon at the increased pressure.

21. A method of internal fluid pressure testing a tubular member while maintaining the member in tension by the fluid test pressure comprising the steps of:

enclosing each end of the tubular member with a housing having a unitary seal-lock ring assembly therein which includes a resilient annular seal body with annular rings formed of circumferential non-resilient segments mounted adjacent each end of the body;

selectively supplying fluid pressure to the housings to radially contract either or both of the seal-lock ring assemblies into sealing and locking relationship adjacent each end of the tubular member;

filling the tubular member with fluid; and increasing the pressure in the fluid filled member and the seal-lock ring assembly for placing the tubular member in tension while it is internally pressure tested with the housings sealed and locked thereon at the increased pressure.

22. A test head which does not require a compressive end force thereagainst to maintain it in sealed and locked relationship on the end of a tubular member as the member is internally fluid pressure tested, comprising:

a housing having one end closed to prevent the tubular member from passing therethrough with an opening in the other end for receiving the end of the tubular member, said housing providing between its ends an annular, inwardly opening recess defined by radial, annular extending end surfaces;

a unitary seal-lock ring assembly within the housing recess constructed and arranged to maintain said housing sealed and locked on the tubular member without requiring an external compressive end force on said housing while internal fluid pressure testing the tubular member; and said housing having port means to conduct fluid to said resilient body in the recess to move said assembly radially into sealing and locking engagement on the tubular member.

23. The test head of claim 22 wherein the port means also fluid fills the tubular member.

24. The test head of claim 23 wherein the port means which supplies fluid to said unitary seal-lock ring assembly is separate from the port means which fluid fills the tubular member.

25. The test head of claim 22 wherein said seal-lock ring assembly includes an annular resilient body with an inner annular surface having a portion for sealably engaging with the tubular member;

first and second annular rings formed of non-resilient segments supported adjacent each end of said body with the segments in at least one of said rings having a radially extending end portion with an axially extending portion projecting laterally from said end portion, said axially extending portion extending adjacent said inner annular surface of said body.

26. The test head of claim 25 including secondary non-resilient segments of generally "Z" shape fitting between said resilient body and said annular ring segments which have end and axially extending portions for spanning the circumferential space between adjacent segments in said annular ring to inhibit extrusion of said resilient body between said circumferentially spaced adjacent segments forming said annular rings.

27. The test head of claim 22 wherein said housing includes a first annular member having a bore extending from one end thereof and terminating in spaced relation to the other end of said first annular member;

a second annular member having an annular recess therein; and means to connect said first and second members together to form said housing.

28. The test head of claim 22 including means to supply fluid pressure to said housing port means to act on said assembly and move it to seal and lock said housing on the tubular member.

* * * * *